US006912145B2

United States Patent
Hung et al.

(10) Patent No.: US 6,912,145 B2
(45) Date of Patent: Jun. 28, 2005

(54) POWER INJECTOR APPARATUS

(75) Inventors: Pai-Fu Hung, Tainan (TW);
Ren-Horng You, Tainan (TW);
Feng-Hsueh Wang, Kaohsiung (TW)

(73) Assignee: Accton Technology Corporation, Hsinchu (TW)

( * ) Notice: Subject to any disclaimer, the term of this patent is extended or adjusted under 35 U.S.C. 154(b) by 166 days.

(21) Appl. No.: 10/628,205

(22) Filed: Jul. 29, 2003

(65) Prior Publication Data

US 2005/0024026 A1 Feb. 3, 2005

(51) Int. Cl.$^7$ .................... H02M 7/00; H01F 17/00
(52) U.S. Cl. ........................ 363/125; 323/355
(58) Field of Search ................... 363/59–61, 84, 363/90, 125; 323/355, 359; 307/3, 4, 44, 52, 63, 69, 72–75, 77, 80, 85–87

(56) References Cited

U.S. PATENT DOCUMENTS

| | | | | |
|---|---|---|---|---|
| 6,031,354 A | * | 2/2000 | Wiley et al. | 320/116 |
| 6,624,635 B1 | * | 9/2003 | Lui | 324/426 |
| 6,794,849 B2 | * | 9/2004 | Mori et al. | 320/107 |
| 6,850,820 B2 | * | 2/2005 | Tajima | 700/286 |

* cited by examiner

*Primary Examiner*—Matthew V. Nguyen

(57) ABSTRACT

The present invention provides a power injector apparatus that can supply two power sources, one from the Ethernet and the other from AC power. The Internet device can select the AC power as a power source when the Internet device requires power exceeding the Hub or the Switch can supply. Moreover, the Internet device can select the Ethernet as the power source when the supplied power is sufficient.

16 Claims, 5 Drawing Sheets

POWER INJECTOR APPARATUS

FIELD OF THE INVENTION

The present invention relates to a power injector apparatus, and more particularly to a power injector apparatus that can inject power into the transmission line of an Internet system.

BACKGROUND OF THE INVENTION

In the past, the Internet apparatus used two independent wires to transmit data and power, respectively. The combination of Rj-45 connectors and four pairs of twisted pair cables is used to transmit data. However, four pins (4, 5, 7, 8 pin) of the RJ-45 connector and two pairs of the twisted pair cables are idle, because only two pairs of the twisted pair cables are occupied while transmitting data. A new technology called Power over Ethernet (POE), therefore, has been developed to utilize the idle pins. This technology uses the unused pins to transmit power. Such technology obviates need for an additional power supply in an Internet apparatus, because required power can be supplied by a central apparatus in an Internet system. This central apparatus can also be combined with an Uninterruptible Power Supply, UPS, to insure that Internet apparatuses connected to the Internet system can work normally when power fails.

This POE apparatus gradually has become an essential part of a wireless Internet base station. Base stations must be located in higher places to improve signal reception and transmission. In general, such higher places do not provide a power outlet. An additional power arrangement, therefore, is required for providing power to the base station, which increases costs. However, the POE technology can solve this problem. The POE technology can provide flexibility when selecting a base station location.

However, the conventional framework has some problems. For example, if the Internet apparatus are not compatible with the POE specification or requires power that exceeds the central apparatus can supply, the conventional central apparatus fail to work.

SUMMARY OF THE INVENTION

As mentioned above, the main object of the present invention is to provide a power injector apparatus that can be adapted to two power sources, one from the Internet and the other from AC power.

The other object of the present invention is to provide a power injector apparatus that can avoid the Internet apparatus failing to work normally when the Internet apparatus requires power that exceed the power that the Hub or the Switch supplies.

Accordingly, the present invention provides a power injector apparatus that can supply two power sources, one from the Internet and the other from AC power. The Internet device can select the AC power to supply power when the Internet device requires power that exceeds the power that the Hub or the Switch supplies, and thus avoid the malfunction of the Internet device due to power shortage. Moreover, the Internet device can also select the Ethernet power source when the supplied power is sufficient.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Without limiting the spirit and scope of the present invention, the power injector apparatus proposed in the present invention is illustrated with one preferred embodiment. One of ordinary skill in the art, upon acknowledging the embodiment, can apply the power injector apparatus of the present invention to various Internet systems. Accordingly, the power injector apparatus of the present invention provides two power sources, one from the Internet and the other from AC power. The power injector of the present invention, therefore, can avoid the malfunction of the Internet apparatus when needed power exceeds the power that the Hub or the Switch can supply. The application of the power injector apparatus of the present invention is not limited by the preferred embodiments described in the following.

Figure 1:
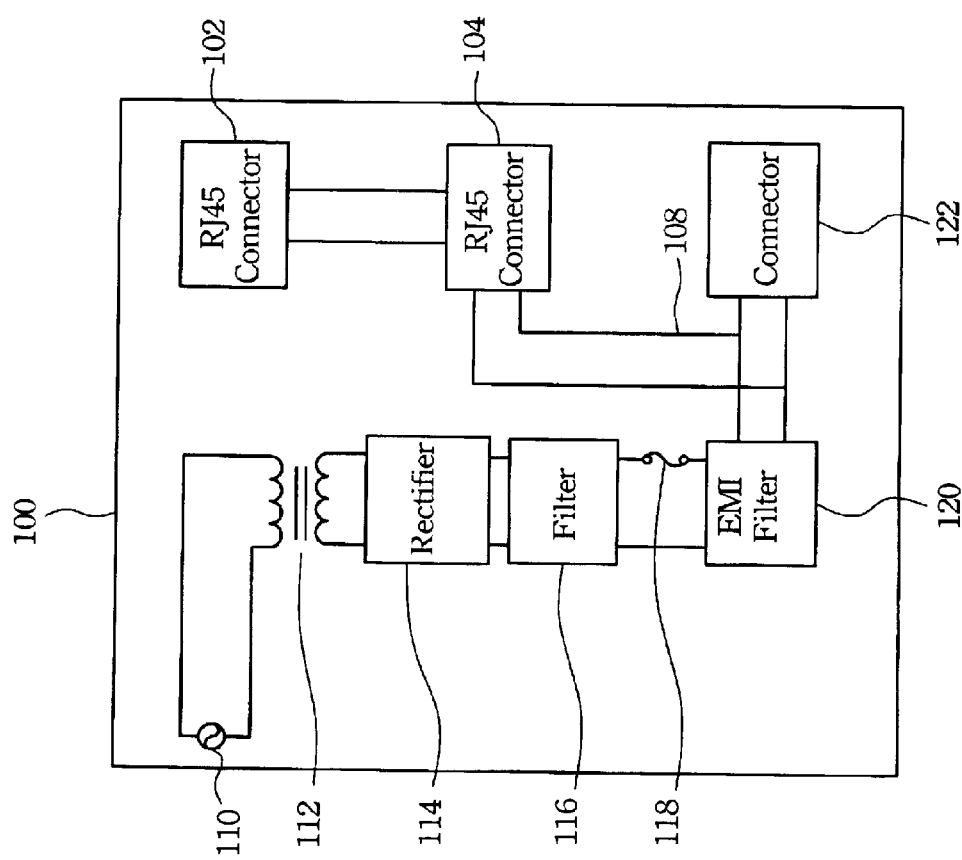
FIG. 1 illustrates a schematic diagram of a power injector in accordance with the first embodiment.

FIG. 1 illustrates a schematic diagram of a power injector in accordance with the first embodiment. The power injector 100 includes two registered jack-45 (RJ-45) connectors 102 and 104. The two RJ-45 connectors 102 and 104 can be connected together when the RJ-45 connector 102 receives data from the Ethernet. The RJ-45 connector 104 is used to provide the connection point to the terminal. In accordance with the preferred embodiment, the terminal is a Voice over IP (VOIP) device, an Access Point or other Internet device. A conductive line 108 can transmit the power from the AC power source 110 to the RJ-45 connector 104. The RJ-45 connector 104 is coupled with the eight twisted-pair cables to transmit power and data. The different twisted-pair cables are used to respectively transmit power and data.

Referring to FIG. 1 again, the power injector 100 can also adopt power from the AC power source 110. A transformer 112 and a rectifier 114 are used to transform the AC power into DC power. A filter 116 is used to filter the DC power. Then, a fuse 118 is used to avoid injecting abnormal current into the connected terminal. An EMI filter 120 is used to avoid electromagnetic interference. A connector 122 connected to the EMI filter is used to provide a connecting point to the terminal. The connector 122 is a DC jack. Moreover, a RJ-45 connector 104 is connected to the EMI filter 120 through a conductive line 108. The DC power, therefore, can be supplied to the RJ-45 connector 104 as well. At this time, four of the eight twisted-pair cables connected with the RJ-45 connector 104 can transmit data to the terminal. The other four twisted-pair cables are used to transmit power to the terminal.

By using the above power injector 100, the terminal can be connected to the RJ-45 connector 104 or the connector 122. On the one hand, the terminal can make a connection with the RJ-45 connector 104 to receive power from Internet system if the terminal is compatible with POE specification. On the other hand, the terminal can make a connection with the connector 122 to receive power from AC power source 110 if the terminal is not compatible with POE specification. At this time, an additional transmission line is required to transmit data.

Figure 2:
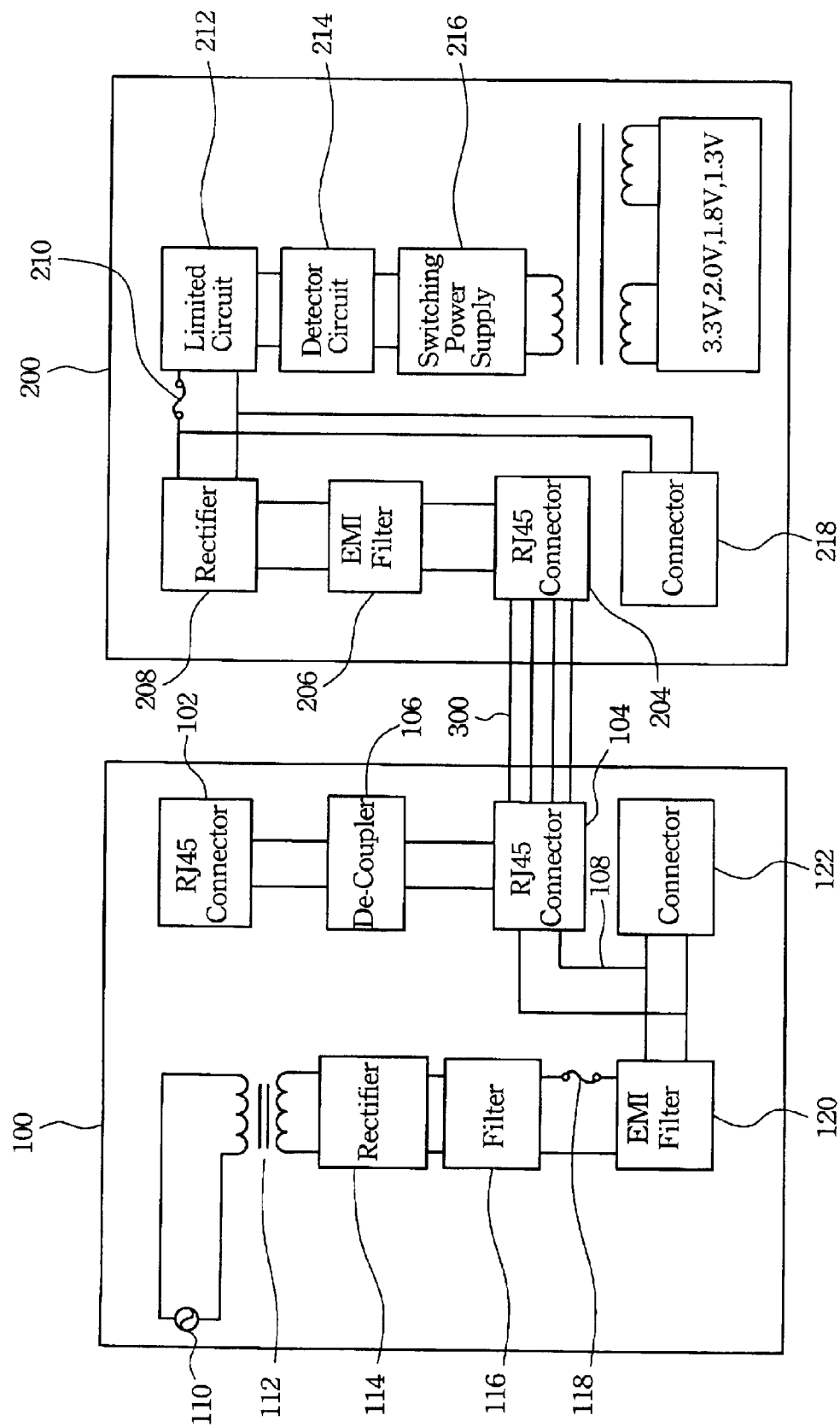
FIG. 2 illustrates a schematic diagram of the power injector described in the first embodiment to supply power to the Internet device.

FIG. 2 illustrates a schematic diagram of the power injector 100 described in the first embodiment to supply power to the terminal. The terminal 200 is a Voice over IP (VOIP) device, an Access Point or other Internet device. When the terminal 200 supports POE technology, the RJ-45 connector 204 of the terminal 200 can be connected to the RJ-45 connector 104 of the power injector 100 through eight twisted-pair cables 300 to receive power and data together. At this time, four of the eight twisted-pair cables 300 are used to transmit data to the terminal 200. The other four twisted-pair cables are used to transmit power to the terminal 200. After the terminal 200 receives power from the power injector 100, the received power can be supplied to the terminal through these devices, an EMI filter 206, a rectifier 208, a fuse 210 for avoiding abnormal current, a limited circuit 212 for avoiding an inrush current, a detector circuit 214 and a switching power supply 216. The detector circuit 214 is used to detect whether or not terminal 200 supports POE technology. After the detector circuit 214 confirms that the terminal 200 support POE technology, power can be continued transmitting to the terminal 200. The type of the switching power supply 216 is a Flyback type, a Forward type, a Push-pull type, half-bridge type or Full-bridge type.

Figure 3:
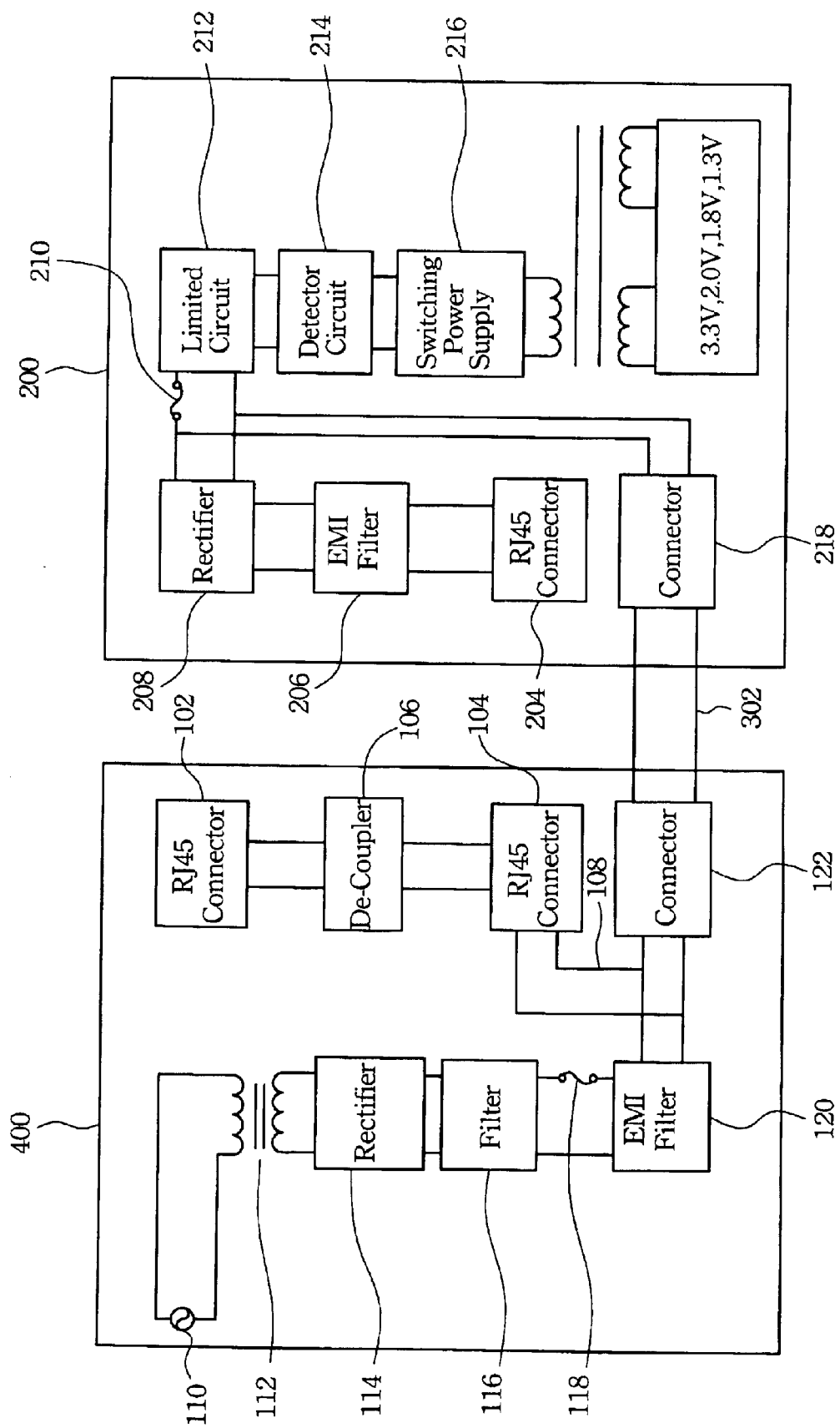
FIG. 3 illustrates a schematic diagram of the power injector described in the first embodiment to supply power to the Internet device.

FIG. 3 illustrates a schematic diagram of the power injector 100 described in the first embodiment to supply power to the terminal 200. The terminal 200 is a Voice over IP (VOIP) device, an Access Point or other Internet device. When the terminal 200 is not compatible with the POE specification, the connector 218 of the terminal 200 can be connected to the connector 122 of the power injector 100 through wire 302 to receive the power from the AC power source 110. On the other hand, the RJ-45 connector 204 of the terminal 200 is connected to an Ethernet (not shown in the figure) to transmit and receive data. In other words, the terminal 200 can select the AC power source 110 as the power source through the power injector 100 of the present invention if it does not support the POE technology. Moreover, the present invention utilizes the transformer of the terminal 200 to transfer the voltage. An additional adaptor, therefore, is not required, which can reduce the cost.

Figure 4:
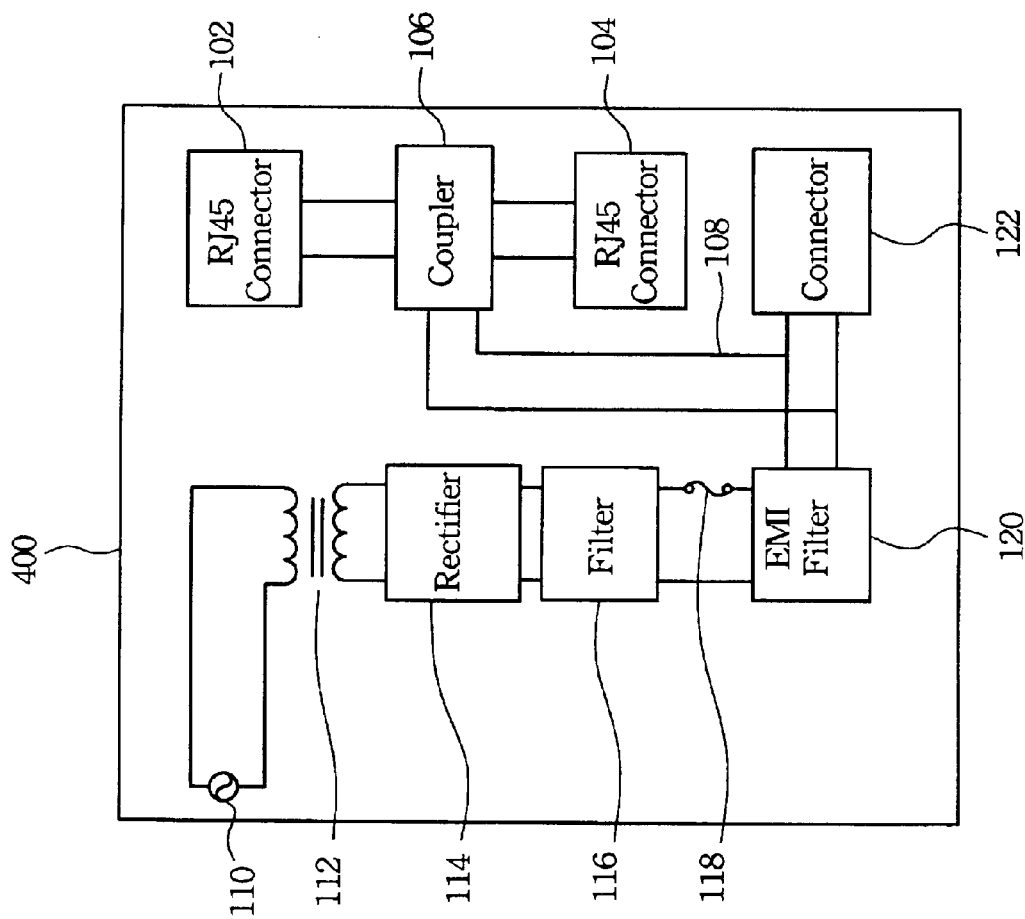
FIG. 4 illustrates a schematic diagram of a power injector in accordance with the second embodiment.

FIG. 4 illustrates a schematic diagram of a power injector 400 in accordance with the second embodiment. In this embodiment, a coupler 106 is used to couple the RJ-45 connector 102 receiving the data with the RJ-45 connector 104. The power from the AC power source 110 is fed into the coupler 106 through the conductive line 108. Then, this power is fed into the RJ-45 connector 104 through the coupler 106. At this time, power and data are coupled to the same twisted-pair cables for transmitting to the terminal.

By using the above power injector 400, the terminal can be connected to the RJ-45 connector 104 or the connector 122. On the one hand, the terminal can make a connection with the RJ-45 connector 104 to receive power and data together if the terminal supports POE technology. On the other hand, the terminal can make a connection with the connector 122 to receive power from AC power source 110 if the terminal does not support POE technology. At this time, an additional transmission line is required to transmit the data.

Figure 5:
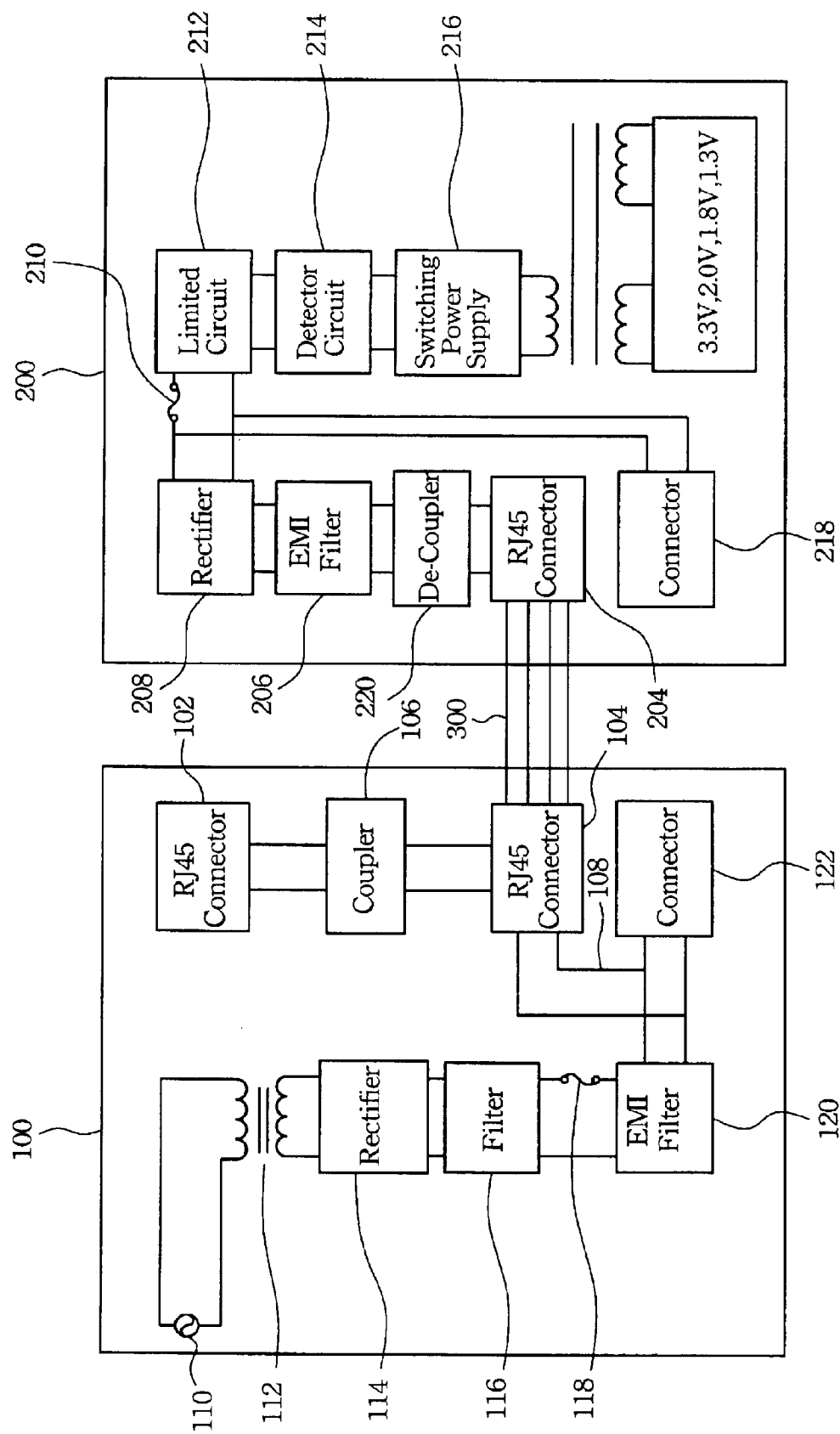
FIG. 5 illustrates a schematic diagram of the power injector described in the second embodiment to supply power to the Internet device.

FIG. 5 illustrates a schematic diagram of the power injector 400 described in the second embodiment to supply power to the terminal. The terminal 200 is a Voice over IP (VOIP) device, an Access Point or other Internet device. When the terminal 200 supports POE technology, the RJ-45 connector 204 of the terminal 200 can be connected to the RJ-45 connector 104 of the power injector 400 through eight twisted-pair cables 300 to receive power and data together. At this time, power and data are coupled to the same twisted-pair cables for transmitting to the terminal 200. The main different between the first and the second embodiment is that the terminal 200 described in the second embodiment requires an additional de-coupler 220 after the RJ-45 connector 204 to decouple the coupled power and data transmitted from the twisted-pair cables 300.

Accordingly, the power injector apparatus of the present invention provides two power sources, one from the Internet and the other from AC power. Therefore, the power injector of the present invention can avoid the malfunction of the terminal when the terminal requires power that exceeds the Hub or the Switch can supply. Moreover, the terminal can also select the Internet system as a power source when the supplied power is sufficient. This power injector apparatus of the present invention can improve convenience.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A power injector apparatus comprising:
   a transforming device for receiving AC power and transforming a level of said AC power to a predetermined level;
   a rectifying device coupled with said transforming device for transforming said AC power into DC power;
   a first interface coupled with said rectifying device for outputting said DC power;
   a second interface coupled with an Internet system for transmitting and receiving an Internet signal; and
   a third interface coupled with said second interface and said rectifying device for outputting said DC power and transmitting and receiving said Internet signal.

2. The power injector apparatus according to claim 1, wherein said AC power is from an AC power source.

3. The power injector apparatus according to claim 1, wherein said first interface is a DC Jack.

4. The power injector apparatus according to claim 1, wherein said second and third interfaces are RJ-45 connectors.

5. The power injector apparatus according to claim 1, wherein said Internet system is an Ethernet.

6. The power injector apparatus according to claim 1, wherein said power injector apparatus further comprises a filtering device coupled with said rectifying device for filtering noise of said DC power.

7. The power injector apparatus according to claim 1, wherein said power injector apparatus further comprises a fuse device coupled with said rectifying device for avoiding an abnormal current.

8. The power injector apparatus according to claim 1, wherein said power injector apparatus further comprises a EMI filtering device coupled with said rectifying device.

9. A power injector apparatus comprising:
- a transforming device for receiving AC power and transforming a level of said AC power into a predetermined level;
- a rectifying device coupled with said transforming device for transforming said AC power into DC power;
- a first interface coupled with said rectifying device for outputting said DC power;
- a second interface coupled with an Internet system for transmitting and receiving an Internet signal;
- a coupling device coupled with said second interface and said rectifying device to couple said DC power and said Internet signal; and
- a third interface coupled with said coupling device for outputting said coupled DC power and Internet signal.

10. The power injector apparatus according to claim 9, wherein said AC power is from an AC power source.

11. The power injector apparatus according to claim 9, wherein said first interface is a DC Jack.

12. The power injector apparatus according to claim 9, wherein said second and third interfaces are RJ-45 connectors.

13. The power injector apparatus according to claim 9, wherein said Internet system is an Ethernet.

14. The power injector apparatus according to claim 9, wherein said power injector apparatus further comprises a filtering device coupled with said rectifying device for filtering noise of said DC power.

15. The power injector apparatus according to claim 9, wherein said power injector apparatus further comprises a fuse device coupled with said rectifying device for avoiding an abnormal current.

16. The power injector apparatus according to claim 9, wherein said power injector apparatus further comprises a EMI filtering device coupled with said rectifying device.

* * * * *